United States Patent Office 2,971,925
Patented Feb. 14, 1961

2,971,925
POLYMERIZATION CATALYSTS

De Loss E. Winkler, Orinda, and Kenzie Nozaki, El Cerrito, Calif.; said Winkler assignor to Shell Oil Company, a corporation of Delaware No Drawing. Filed Feb. 16, 1959, Ser. No. 793,250

4 Claims. (Cl. 252—429)

This invention relates to the polymerization of mono-alpha-olefins. More particularly it relates to such polymerizations using novel polymerization catalysts.

It is known that mono-alpha-olefins as ethylene, propylene, styrene, octene-1, decene-1 and other mono-alpha-olefins may be polymerized to produce linear polymers which are substantially free of cross-linking and side-branching. The processes by which this is accomplished have come to be termed "low pressure processes" or "Ziegler processes." The polymers are prepared in the presence of the so-called "low pressure catalysts" or "Ziegler catalysts." In the broadest embodiment, the low pressure catalysts may be defined as the reaction product of a transition metal compound wherein the metal is selected from groups IV–VIII of the periodic table and a strong reducing agent, particularly compounds of metals of groups I–III of the periodic table. From this broad definition it will be seen that the low pressure catalysts may comprise an infinite number of combinations and permutations, and indeed many combinations are described in the prior art. Nevertheless, while there are many catalysts within this group that can be used to polymerize mono-alpha-olefins it is recognized that the catalyst compositions and the methods of using them in polymerization of alpha-olefins are extremely sensitive. For example, seemingly minor impurities contained in the catalyst components or in the monomer to be polymerized may have adverse effects on the ultimate polymer. Similarly, seemingly minor variations in catalyst formulations, as in the proportions of the components, may have substantial effects on the molecular weight and molecular weight distribution of the polymer. Further the percentage of linearity of the polymer may be also affected by such modifications and this in turn can be correlated to the ultimate performance of the polymer during processing and to its utility. The present invention affords a unique low pressure catalyst which has the ability to produce polymers of mono-alpha-olefins which are characterized by a very high degree of linearity. This is of considerable importance, as it relates to the ultimate performance of the polymer.

It is an object of this invention to provide polymers of mono-alpha-olefins which polymers have improved physical properties. It is another object of this invention to provide novel low pressure catalysts which will produce improved polymers of propylene and other mono-alpha-olefins. Other objects will become apparent as the description of this invention proceeds.

These and other objects are accomplished by a catalyst composition produced by the steps comprising (1) reacting hydrocarbon solutions of aluminum triethyl and titanium tetrachloride in a mole ratio ranging from about .1:1 to less than .4:1 at elevated temperatures until the aluminum triethyl is completely oxidized and (2) thereafter reacting total products of (1) with a hydrocarbon solution of aluminum diethyl chloride in an amount to give a total aluminum to titanium mole ratio of at least 1:1. The resulting product is a polymerization catalyst for mono-alpha-olefins and it will hereinafter be shown to be capable of producing polymer having improved physical properties. This is particularly the case as it relates to the polymer of propylene.

From the foregoing description of the catalyst it will be seen that there is no choice in the selection of catalyst components as the specific compounds described above are essential. Furthermore the order of reaction is also critical as well as the amount of the specific catalyst components. The only substantial latitude permitted in the preparation of the new catalyst is in the heat treatments and in the concentrations of the components in the hydrocarbon solvent. Any other departure in the preparation of the catalyst, as described above, will result in disadvantages and ultimately produce polymers which are substantially inferior to those obtained using the novel catalyst of this invention.

In the first step of the catalyst preparation the reaction between the titanium tetrachloride and the aluminum triethyl effects a reduction of some of the titanium tetrachloride to titanium trichloride. Stoichiometrically, complete reduction is accomplished by the reaction of .33 mole of aluminum triethyl with 1 mole of the titanium tetrachloride but, for the purposes of this invention, it is found that there must not be .4 or more moles of the aluminum triethyl per mole of the titanium tetrachloride. Hence the reaction in the first step between the aluminum triethyl and the titanium tetrachloride must be in an aluminum triethyl to titanium tetrachloride mole ratio of less than .4 to 1. The minimum ratio is .1 to 1. In the more preferred procedures the mole ratio is between .2–.33:1 as these ratios ultimately produce the best combination of polymerization rates, conversions and percentages of linear polymer.

The reaction between the titanium tetrachloride and aluminum triethyl is carried out at elevated temperatures for a period of time sufficient to oxidize all of the aluminum triethyl. The time is influenced by the temperature and heating for 20 minutes at 80° C. is suggested as a minimum and heating for 2 hours at 80° C. is used most often in this specification. A rather surprising finding is that polypropylene of a substantially higher crystallinity is obtained if the heating is carried out for periods of time substantially in excess of the minimum required to oxidize the aluminum triethyl. No explanation is offered for this phenomenon other than to surmise that a different catalyst intermediate, which has not been identified, is formed by the longer heat treatment.

The initial reaction between the titanium tetrachloride and the aluminum triethyl is carried out with these reactants in solution with hydrocarbon solvents as heptane, octane, pentane, isopentane and the like. The solutions of the titanium tetrachloride and the aluminum triethyl are prepared and measured amounts of each solution are mixed together to give the desired mole ratios which, as previously indicated, range from an aluminum to a titanium mole ratio ranging from less than .4:1 to about .1:1. The reaction between the titanium tetrachloride and the aluminum triethyl at elevated temperatures terminates the first step of the catalyst preparation and at this point the reaction mixture comprises a solid suspension in the hydrocarbon diluent and the total mixture has a brown color.

The hydrocarbon solutions of the catalyst components may be of any concentration and solutions prepared by mixing 100 millimoles per liter of solvent are found to be convenient for subsequent metering. A surprising finding is that advantages in the ultimate polymer are obtained as the concentration of the components in the solvent are increased, and this will be shown more fully hereinafter.

The second step of the catalyst preparation requires adding and reacting to the total mixture prepared above aluminum diethyl chloride which is contained in solution with a hydrocarbon solvent. The amount of the aluminum diethyl chloride that is added may vary a great deal with the provision that the minimum be at least sufficient to provide a total aluminum to titanium mole ratio of 1.0. Thus the minimum depends entirely on the mole ratio of the aluminum triethyl and titanium tetrachloride selected in the first step. Any amount greater than the minimum is suitable but large excesses, say in the order of 10 moles, are uneconomical and wasteful. In the preferred procedure, aluminum diethyl chloride is added in an amount to give a total aluminum to titanium mole ratio ranging from about 2:1 to about 6:1.

After the aluminum diethyl chloride is added, the total mixture, which is still brown in color, is agitated briefly to reduce completely the titanium tetrachloride. It is not necessary to cool or heat the mixture to which the aluminum diethyl chloride is added and the catalyst will be stable for several days. The total mixture consists of a suspension of fine, brown particles in the hydrocarbon solvent. The suspension, if permitted to stand for a while will begin to settle. Accordingly, before being used, it should be agitated in order to produce a homogeneous product which is the active catalyst of this invention.

The polymerizations of mono-alpha-olefins, with the novel catalysts, are conducted in agitated pressure vessels under conditions that exclude air and other atmospheric impurities including particularly moisture. The vessel, after purging with an inert gas, is charged with the catalyst suspension prepared as described above. An additional quantity of hydrocarbon solvent is usually added also and thereafter the monomer to be polymerized is charged to the vessel and the polymerization begins. At first, the temperature within the reactor will rise due to an exotherm so that cooling may be supplied initially in order to maintain any desired polymerization temperature which, in all cases should be less than about 100° C. and more preferably from about 40 to 80° C. The pressures are not critical and may be autogenic pressures which will vary depending upon the quantity of the solvent in the reactor, the nature of the monomer to be polymerized, the temperatures, and the like. In batch operations, the polymerization may be terminated when monomer is no longer absorbed as indicated by a suitable pressure gauge. In continuous operations the polymerization mixture passes through a continuous reactor of any suitable design and the polymerizations in such cases are adjusted by the residence time which may be determined by a few preliminary runs at the particular concentrations, temperature, pressures and the like that are adopted. After the polymerization is complete the polymer is recovered as a slurry of the solid polymer in hydrocarbon dilutions and to separate the polymer from the solvent a simple filtration is adequate. Thereafter the polymer may be washed a few times in order to separate catalyst residues. Further treatment may be undertaken as will be understood from the prior art.

The recovered polymer will be found, generally, to have a rather high molecular weight as indicated by intrinsic viscosity determinations in decalin at 150° C. For some applications the molecular weight may be too high and polymer of controlled molecular weight may be obtained by conducting the polymerization in the presence of various additives which reduce the molecular weight. The more effective additives for this purpose include hydrogen and zinc diethyl. Other additives which serve other functions may be present during the polymerization. The proportion of the crystalline content of the polymer may increase by the use of additives. The additives, should they be used in the polymerization, are fed into the reactor before the polymerization and the amounts that are used will vary depending on the specific additive and the molecular weight of the polymer that it is desired to produce.

In the examples and tables that follow, the intrinsic viscosities are determined from measurements of specific viscosities in decalin at 150° C. and the insoluble content is determined by the soxhlet extraction of 6 grams of polymer in isooctane at its boiling point for 6 to 7 hours. The extraction cycle is approximately 4 minutes.

EXAMPLE 1

This example demonstrates the nature of polypropylene prepared using a more conventional catalyst which is made by mixing stock solutions of aluminum triethyl and titanium tetrachloride in an Al:Ti ratio greater than 1:1. A brown catalyst results when aluminum triethyl and titanium tetrachloride are mixed in an Al:Ti ratio less than 0.9 and allowed to react for say two hours at 80° C. If to this brown catalyst more triethyl aluminum is added the precipitate turns black, probably due to the reduction of $TiCl_3$ to $TiCl_2$ by the excess aluminum triethyl. Catalysts prepared by either of the above methods possess a low order of stereospecificity as indicated by the low insolubles content of the polymers produced.

A black catalyst was prepared by mixing a hydrocarbon solution of 10 millimoles of $TiCl_4$ (100 ml.) with 13 millimoles of aluminum triethyl (120 ml.) and reacting for two hours at 80° C. To this there was then added 38 millimoles of aluminum triethyl and the volume of solvent brought up to one liter. This catalyst was used to polymerize propylene which polymerization was carried out by feeding a steady stream into a reactor for one hour at 60°C. and at atmospheric pressure. The polymerization was terminated by adding a small amount of ethanol to the reactor. The polymer slurry was then added to an equal volume of ethyl alcohol to precipitate the amorphous polymer. After filtering, washing, and drying the total polymer weighed 58.5 grams and had an I.V. of 1.5. On extracting the polymer was found to be only 44% insoluble.

EXAMPLE 2

Another catalyst was prepared by mixing under a nitrogen atmosphere a hydrocarbon solution of 10 millimoles of $TiCl_4$ (100 ml.) with 3.6 millimoles of aluminum triethyl (36 ml.) and reacting two hours at 80° C. This was then added to four liters of purified isooctane containing 46 millimoles of $AlEt_3$, making the overall Al:Ti ratio 5.0. To this reaction mixture contained in a stainless steel autoclave, propylene was added at an average pressure of 50 p.s.i.g. and 60° C. After 1.5 hours the reaction was stopped by the addition of alcohol. The polymer was recovered as previously described. The dried polymer weighed 647 g. It had an I.V. of 3.53 and was only 59% insoluble.

If instead of adding aluminum triethyl in the second step of the catalyst preparation or to the reactor during or before polymerization, one adds diethyl aluminum chloride ($AlEt_2Cl$), then the catalyst does not turn black but remains brown and its stereo-specificity is greatly improved giving polymers of high insoluble content as shown by the following example.

EXAMPLE 3

A catalyst was prepared by mixing under a nitrogen atmosphere a hydrocarbon solution of 20 millimoles of $TiCl_4$ (200 ml.) with 7.2 millimoles of $AlEt_3$ (72 ml.) and reacting two hours at 80° C. This mixture was then centrifuged, the supernatant liquid decanted, and 20 millimoles (200 ml.) of $AlEt_2Cl$ added and the mixture was heated another hour at 80° C. This catalyst was then added to 4 liters of purified isooctane containing 60 millimoles of AlEt₂Cl making the overall Al:Ti ratio about 4.4:1. To this reaction mixture contained in a stainless steel stirred autoclave, propylene was added at an average pressure of 50 p.s.i.g. and 50° C. After 4.5 hours the reaction was stopped by the addition of alcohol and the polymer recovered as previously described. The dried polymer weighed 439 g. It had an I.V. of 8.8 and was 90% insoluble in hot isooctane.

EXAMPLES 4–9

In this series of experiments the criticality of the mole ratio of aluminum triethyl to the titanium tetrachloride in the first step is illustrated. In all cases the catalyst components were used as heptane solutions of 100 millimoles per liter. Twenty millimoles of TiCl₄ (200 ml.) were reacted with various amounts of AlEt₃ for two hours at 80° C. Thereafter the resulting suspensions were treated for one hour at 80° C. with 20 millimoles of AlEt₂Cl (200 ml.). The catalysts were used with 4 liters of solvent containing 60 millimoles of AlEt₂Cl. Polymerizations were carried out at 50° C. with an average propylene pressure of 50 p.s.i.g. The results are shown in Table I.

Table I

| Example | 4 | 5 | 6 | 7 | 8 | 9 |
|---|---|---|---|---|---|---|
| AlEt₃/TiCl₄, mole ratio in 1st step | .2 | .3 | .36 | .4 | .5 | .6 |
| Yield, grams | 295 | 398 | 439 | 319 | 338 | 304 |
| Length of run, hours | 5 | 5 | 4.5 | 3.2 | 6 | 6 |
| Percent w., Insoluble | 92 | 90 | 90 | 83 | 64 | 45 |
| I.V. | 9.3 | 7.8 | 8.8 | 8.0 | 7.5 | 7.0 |
| Yield Point, p.s.i. | 3,860 | 3,910 | 3,770 | | | |
| Flexural Stiffness, p.s.i. | 109,000 | 106,000 | 116,000 | | | |

EXAMPLES 10 AND 11

These experiments illustrate the kind of results that are obtained using other aluminum alkyls in the first step of the catalyst preparation. The procedures of Example 8 are repeated in all respects except that aluminum triisobutyl and aluminum tripropyl, respectively, are used instead of the aluminum triethyl. The results are shown in Table II.

Table II

| AlR₃ | Al triisobutyl | Al Tripropyl |
|---|---|---|
| AlR₃/TiCl₄ mole ratio | .5 | .5 |
| Yield, grams | 255 | 281 |
| Length of run, hours | 6 | 6 |
| Percent w., Insolubles | 57 | 60 |
| I.V. | 4.1 | 4.3 |

EXAMPLES 12–16

These examples are illustrative of other low pressure catalyst systems and indicate still further the criticality of the catalyst systems of this invention. The polymerizations were carried out in 50 ml. of heptane at 125 p.s.i.g. of propylene and at 85° C. The catalysts were prepared by mixing TiCl₄ and the indicated reducing agent, and reacting them at the indicated time and temperature. The results are summarized in Table III.

Table III

| Ex. | TiCl₄ mmoles | Reducing agent, mmoles | Pretreatment time, hr./° C. | AlR₃ in 2nd step, mmoles | Run time, hr. | Percent Insolubles |
|---|---|---|---|---|---|---|
| 12 | 4.6 | 12.5 AlEt₃ | 0/0 | | 2.0 | 22.0 |
| 13 | 4.6 | 4.6 AlEt₃ | 1/225 | 14 AlEt₃ | 1.0 | 54.0 |
| 14 | 4.6 | 2.9 Al(iBu)₃ | 1/250 | 6.3 Al(iBu)₃ | 2.0 | 69.0 |
| 15 | 4.0 | 8.0 Na | .1/175 | 10 AlEt₃ | 7.0 | 42.0 |
| 16 | 4.0 | 20 NaH | 1/300 | 13 AlEt₃ | 2.0 | 42.0 |

As previously indicated some advantage will be realized if the heating cycle in the first step of the catalyst preparation is extended. This is shown in the following examples.

EXAMPLES 17–20

The catalyst was prepared by reacting 10 millimoles of TiCl₄ (100 ml.) with 3 millimoles of AlEt₃ (30 ml.) for various lengths of time at 80° C. Thereafter 10 millimoles of AlEt₂Cl was added as a 20% solution in isooctane and the heating was continued for another hour at 80° C. This catalyst was used with 4 liters of purified isooctane containing 50 millimoles of AlEt₂Cl. Polymerizations were at 50° C. with 60 p.s.i.g. propylene pressure. The effect of varying the heating period is shown in Table IV.

Table IV

| Example | Heating Time, hours | Percent Insolubles | Yield point stress, p.s.i., ASTM |
|---|---|---|---|
| 17 | .25 | 86 | 3,660 |
| 18 | 1 | 93 | 3,670 |
| 19 | 2 | 94 | 4,300 |
| 20 | 24 | 96 | 4,750 |

From Table IV, it will be observed that the longer heat treatment raises considerably the insolubles content of the polypropylene and also the yield point stress. Similar improvements are obtained if the reaction product of the aluminum triethyl and titanium tetrachloride are heated for two hours at 100° C., at 170° C. for 20 minutes or any equivalent time-temperature relationship. An equivalent time-temperature relationship is simply determined by heating the mixture of the first stage until it develops a very slight purple tinge, or longer.

In the above examples the catalyst components are mixed together in the desired mole ratios by metering solutions of 100 millimoles per liter. A surprising finding is that increasing the concentration of the solution in the catalyst preparation step while maintaining the same molar ratios will produce polymer having a high insolubles content and also a higher bulk density. The higher bulk density permits considerable improvements in the polymerization because higher polymer concentrations in the reactor are permitted without causing fouling of the reactor. Concurrently the conversion rates are quite high. This is shown in the following examples.

EXAMPLES 21–25

In these examples the catalyst is prepared as indicated previously by mixing the catalyst components in the concentration shown. In all cases the heat treatment in the first step was at 80° C. for two hours and at 80° C. for one hour in the second step. The mole ratios of the titanium tetrachloride:aluminum triethyl:aluminum diethyl chloride were 3:1:3 in the catalyst preparation step. The results are shown in Table V.

Table V

| Example | Concentration, m moles/l. | | | Insolubles, Percent | I.V. | Bulk Density |
|---|---|---|---|---|---|---|
| | TiCl₄ | AlEt₃ | AlEt₂Cl | | | |
| 21 | 100 | 100 | 100 | 92 | 9.6 | .08–.11 |
| 22 | 700 | 700 | 700 | 96 | 8.2 | .14–.18 |
| 23 | 980 | 835 | 820 | 95 | 10.3 | .14–.17 |
| 24 | 973 | 1,090 | 935 | 94 | 8.0 | .13–.15 |
| 25 | 1,200 | 1,200 | 1,200 | 95 | 9.4 | .14–.18 |

From the foregoing examples and description it will be seen that no variations in the catalyst components are permitted. Variations in the proportions, within specified limits, are permitted as well as in heat treatment conditions and concentrations of the solutions of the catalyst components. In respect to the latter, the concentration preferably is in excess of about 200 millimoles per liter of solvent, and more preferably in excess of about 250 millimoles per liter. In regard to the heat treatment conditions, it is not necessary to heat the catalyst composition after the addition of the aluminum diethyl chloride although a brief heating will hasten the catalyst preparation step.

We claim as our invention:

1. A catalyst composition prepared by the sequence of steps comprising (1) reacting hydrocarbon solutions of aluminum triethyl and titanium tetrachloride in a mole ratio ranging from about .1:1 to less than .4:1 at elevated temperatures until at least the aluminum triethyl is completely oxidized and (2) thereafter reacting the total product of (1) with a hydrocarbon solution of aluminum diethyl chloride in an amount to give a total aluminum to titanium mole ratio of at least 1:1.

2. The catalyst composition of claim 1 wherein the reaction between the titanium tetrachloride and aluminum triethyl is continued at least until the composition develops a purple tint.

3. The catalyst composition of claim 1 wherein the hydrocarbon solutions of the catalyst components are in a concentration in excess of 200 millimoles per liter of solvent.

4. A catalyst composition prepared by the sequence of steps comprising (1) reacting hydrocarbon solutions of aluminum triethyl and titanium tetrachloride in a mole ratio of about 0.33:1 at elevated temperatures until at least the aluminum triethyl is completely oxidized and (2) thereafter reacting the total product of (1) with a hydrocarbon solution of aluminum diethyl chloride in an amount to give a total aluminum to titanium mole ratio of at least 1:1.

References Cited in the file of this patent

UNITED STATES PATENTS

| 2,898,327 | McCulloch et al. | Aug. 4, 1959 |
| 2,943,063 | Ebey et al. | June 28, 1960 |

FOREIGN PATENTS

| 526,101 | Italy | May 14, 1955 |

Notice of Adverse Decision in Interference

In Interference No. 93,423 involving Patent No. 2,971,925, DeL. E. Winkler and K. Nozaki, POLYMERIZATION CATALYSTS, final judgment adverse to the patentees was rendered Oct. 25, 1965, as to claims 1 and 4.
[*Official Gazette December 14, 1965.*]